United States Patent
Gonzalez et al.

(10) Patent No.: US 9,696,510 B1
(45) Date of Patent: Jul. 4, 2017

(54) SMALL FORM FACTOR FLAME RESISTANT LOW SMOKE HALOGEN FREE FIBER OPTIC CABLE

(71) Applicant: HITACHI CABLE AMERICA, INC., Manchester, NH (US)

(72) Inventors: Eduardo Denis Garza Gonzalez, Manchester, NH (US); Henrick Jason Rice, Weare, NH (US); Kenneth Christopher Nardone, North Bennington, VT (US); Jim Hardy, Manchester, NH (US)

(73) Assignee: Hitachi Cable America Inc., Manchester, NH (US)

( * ) Notice: Subject to any disclaimer, the term of this patent is extended or adjusted under 35 U.S.C. 154(b) by 0 days.

(21) Appl. No.: 15/393,929

(22) Filed: Dec. 29, 2016

Related U.S. Application Data

(60) Provisional application No. 62/272,967, filed on Dec. 30, 2015.

(51) Int. Cl.
*G02B 6/44* (2006.01)
*G02B 6/04* (2006.01)

(52) U.S. Cl.
CPC ............. *G02B 6/4432* (2013.01); *G02B 6/04* (2013.01); *G02B 6/4436* (2013.01)

(58) Field of Classification Search
CPC ....... G02B 6/4432; G02B 6/4436; G02B 6/04
USPC .................................................. 385/100–114
See application file for complete search history.

(56) References Cited

U.S. PATENT DOCUMENTS

| | | | | |
|---|---|---|---|---|
| 4,605,818 | A * | 8/1986 | Arroyo ................ | G02B 6/4436 156/54 |
| 4,653,851 | A * | 3/1987 | Pedersen .............. | G02B 6/4436 385/103 |
| 4,941,429 | A * | 7/1990 | Wilkinson ........ | H01L 21/67017 118/500 |
| 5,024,506 | A * | 6/1991 | Hardin .................... | H01B 7/29 385/102 |

(Continued)

OTHER PUBLICATIONS

Low-Shrink LS-HFFR Jacket Compound for Indoor/Outdoor Applications Exhibits Enhanced High-Temperature Performance product sheet from Teknor Apex.*

*Primary Examiner* — Thomas A Hollweg
*Assistant Examiner* — Guy Anderson
(74) *Attorney, Agent, or Firm* — Davis & Bujold, PLLC; Michael J. Bujold

(57) ABSTRACT

A fiber optic cable which comprises at least one subassembly. Each subassembly comprises 1 to 12 optical fibers, a plurality of yarn strength members free halogens, and a first jacket free of any halogens and having a thickness of between about 0.254 to about 0.305 mm. The first jacket surrounds and completely encases the 1 to 12 optical fibers and the plurality of yarn strength members to form the subassembly. The first jacket is manufactured from a material which has a limiting oxygen index (LOI) of at least 40 and a shrinkage of the first jacket being no greater than about 3.5%. The fiber optic cable has a crush resistance of at least 35N/cm, allows less than a 0.4 db/km increase of optical attenuation from −20 to 70 C and meets requirements according to each of IEC 60332-3-24 (Flame Spread), IEC 61034-2 (Low smoke), and IEC 60754-1&2 (non-Halogen); and the fiber optic cable has a flexural modulus of about 40,000 psi.

20 Claims, 10 Drawing Sheets

— Crush analysis of 2.0 mm tube at 4 different levels of normalized force

(56) References Cited

U.S. PATENT DOCUMENTS

| | | | | |
|---|---|---|---|---|
| 5,074,640 A * | 12/1991 | Hardin | | G02B 6/4401 |
| | | | | 174/120 R |
| 6,236,791 B1 * | 5/2001 | Lausch | | G02B 6/4436 |
| | | | | 385/109 |
| 7,050,688 B2 * | 5/2006 | Lochkovic | | G02B 6/4402 |
| | | | | 385/114 |
| 7,221,841 B2 * | 5/2007 | Chase | | C03C 25/106 |
| | | | | 385/128 |
| 8,582,942 B1 * | 11/2013 | Burnett | | G02B 6/4434 |
| | | | | 385/102 |
| 9,336,927 B2 * | 5/2016 | Sun | | C08L 23/10 |
| 9,459,423 B2 * | 10/2016 | Gallo | | G02B 6/4436 |
| 9,482,835 B2 * | 11/2016 | Granger | | G02B 6/4488 |
| 2003/0059613 A1 * | 3/2003 | Tirelli | | C08K 3/0058 |
| | | | | 428/375 |
| 2004/0151906 A1 * | 8/2004 | Pinto | | G02B 6/4436 |
| | | | | 428/375 |
| 2005/0199415 A1 * | 9/2005 | Glew | | G02B 6/4429 |
| | | | | 174/113 C |
| 2007/0102188 A1 * | 5/2007 | Glew | | H01B 7/295 |
| | | | | 174/113 C |
| 2010/0260459 A1 * | 10/2010 | Bohler | | G02B 6/4435 |
| | | | | 385/107 |
| 2010/0278492 A1 * | 11/2010 | Bohler | | G02B 6/4435 |
| | | | | 385/107 |
| 2011/0284287 A1 * | 11/2011 | Glew | | G02B 6/4429 |
| | | | | 174/99 R |
| 2012/0063730 A1 * | 3/2012 | Gagnon | | G02B 6/4436 |
| | | | | 385/100 |
| 2012/0225291 A1 * | 9/2012 | Karayianni | | C08L 67/025 |
| | | | | 428/375 |
| 2013/0327558 A1 * | 12/2013 | Karayianni | | H01B 3/422 |
| | | | | 174/110 SR |
| 2014/0063838 A1 * | 3/2014 | Kouzmina | | G02B 6/0005 |
| | | | | 362/558 |
| 2014/0106637 A1 * | 4/2014 | Bertucelli | | C08J 5/24 |
| | | | | 442/136 |
| 2015/0049996 A1 * | 2/2015 | Gibbs | | G02B 6/441 |
| | | | | 385/103 |
| 2015/0131952 A1 * | 5/2015 | Gallo | | G02B 6/4436 |
| | | | | 385/102 |
| 2015/0155075 A1 * | 6/2015 | Sun | | H01B 7/295 |
| | | | | 523/179 |
| 2015/0226928 A1 * | 8/2015 | Ceschiat | | G02B 6/4438 |
| | | | | 385/112 |
| 2016/0145463 A1 * | 5/2016 | Karayianni | | C08L 67/025 |
| | | | | 428/480 |
| 2016/0377825 A1 * | 12/2016 | Bringuier | | G02B 6/443 |
| | | | | 385/113 |
| 2017/0069408 A1 * | 3/2017 | Gagnon | | H01B 7/295 |

* cited by examiner

FIG. 1 PRIOR ART – A stranded loose tube fiber optic cable
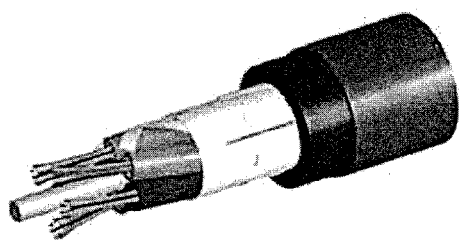
FIG. 2 PRIOR ART – A detail showing a stranded loose tube fiber optic cable
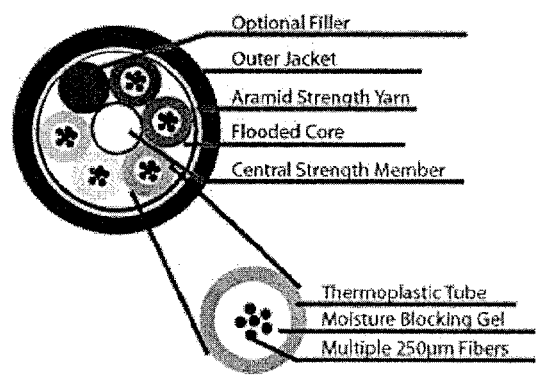

FIG. 3 PRIOR ART – Depicts helical motion of fibers within stranded loose tube cables
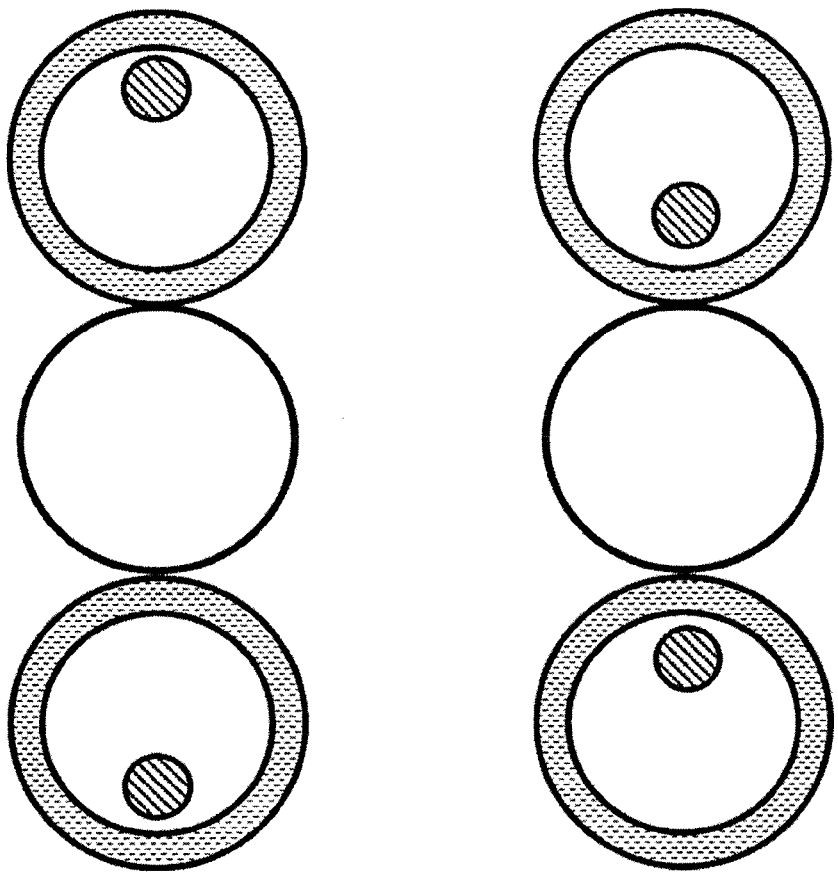
FIG. 4 PRIOR ART – Excess fiber length within a buffer tube or jacket
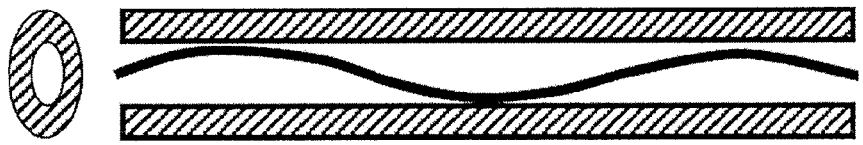

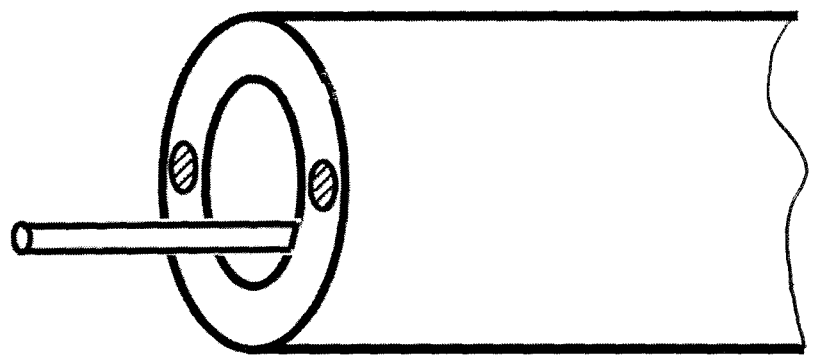
FIG. 5 PRIOR ART
FIG. 6 – Tube deformation under light load
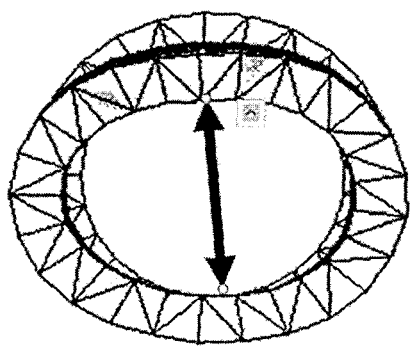

FIG. 7 – Tube deformation under medium load
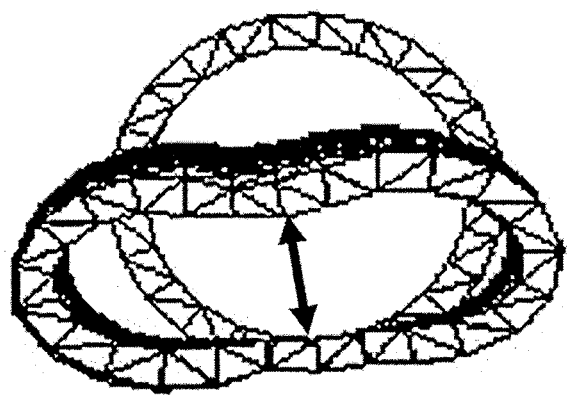
FIG. 8 – Tube deformation under heavy load
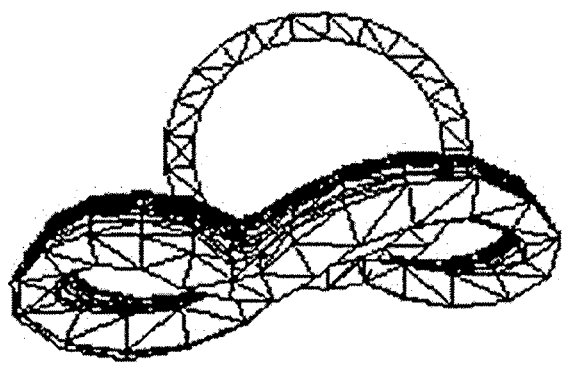

FIG. 9 – Crush analysis of 2.0 mm tube at 4 different levels of normalized force
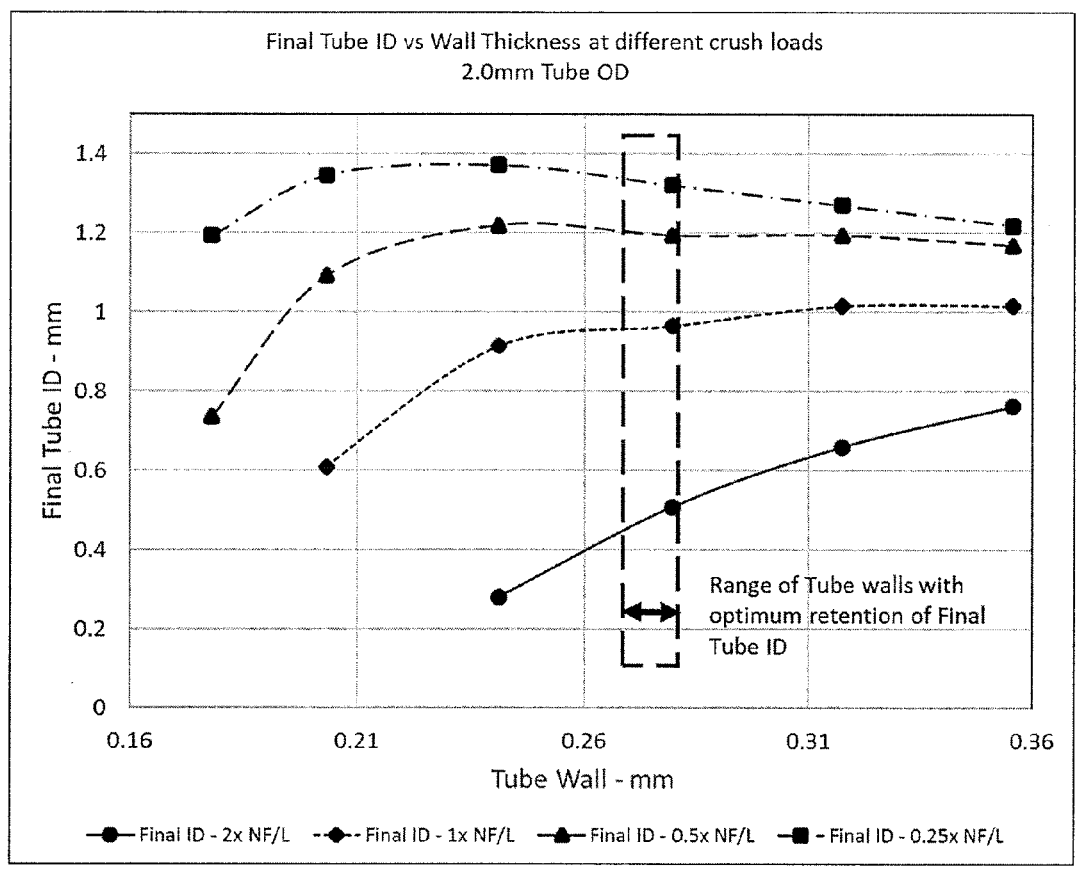

FIG. 10 – Crush analysis of 2.1 mm tube at 4 different levels of normalized force
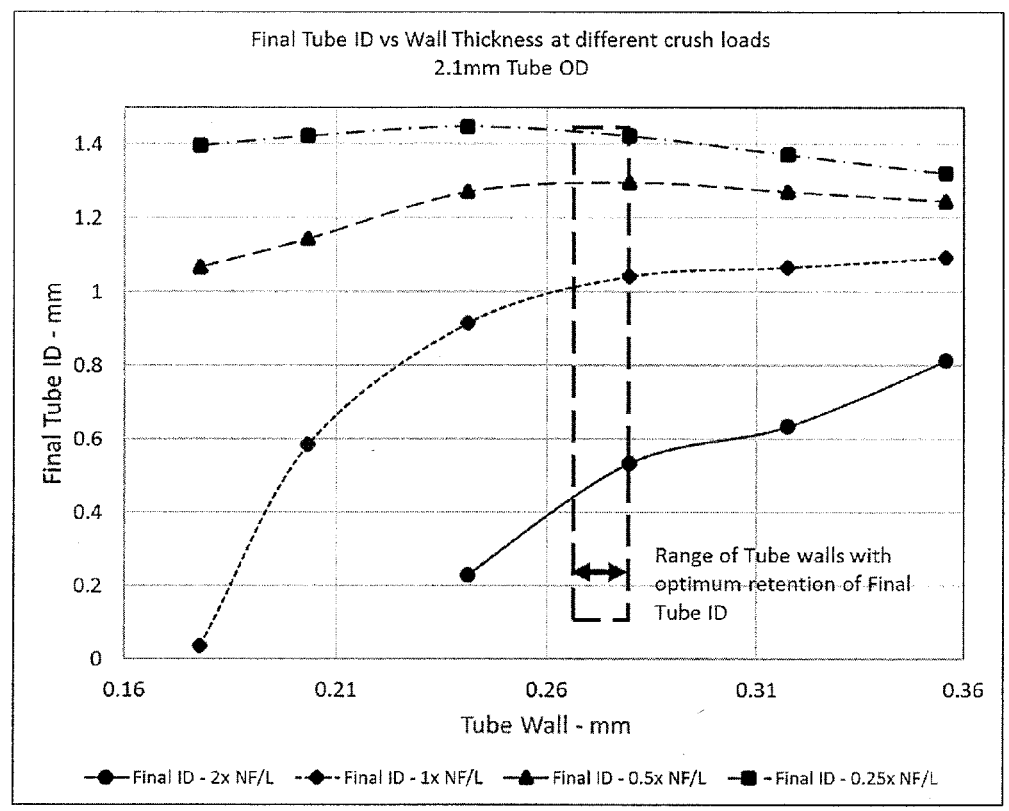

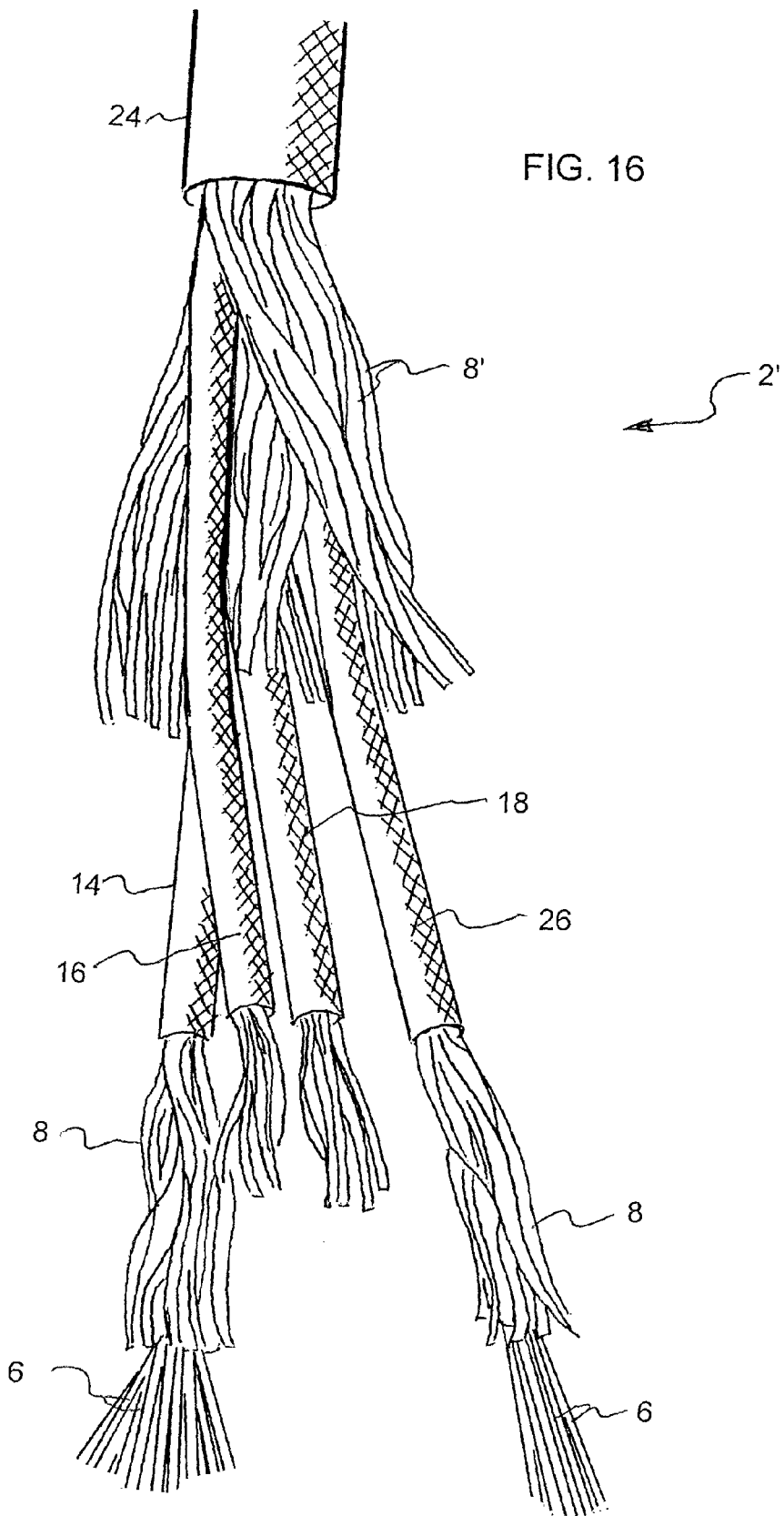

SMALL FORM FACTOR FLAME RESISTANT LOW SMOKE HALOGEN FREE FIBER OPTIC CABLE

FIELD OF THE INVENTION

The present invention relates to an improved fiber optic cable which contain a plurality of optical fibers and yarn strength members and is completely free of any halogen(s). The fiber optic cable has an exterior jacket material which has a jacket shrinkage of about 3.5% or less, a flex modulus of the outer most tube or jacket is at least about 30,000 psi and preferably 40,000 or more, a limiting oxygen index (LOI) of at least 38 and preferably 50, and meets requirements according to each of IEC 60332-3-24 (Flame Spread), IEC 61034-2 (Low smoke), and IEC 60754-1 &2 (non-Halogen).

BACKGROUND OF THE INVENTION

As fiber cables continue their growth into premise and the distribution portions of the communication system, a need for smaller cables and higher fiber density grows.

However, smaller cables tend to have a smaller allowable margin of length change compared to larger cables. Smaller cables also have a corresponding smaller amount of space for containing the fiber. This smaller space causes buckling of the fiber if the cable shrinks to a length shorter than the fibers, then the fibers will tend to buckle under compressive load. The buckling induces a great number of small perturbations and bending of the fiber which causes additional and undesired optical signal attenuation.

Another need in the industry is cable which has good flame resistance, crush resistance, and physical performance. It is difficult to obtain all those properties in one cable design. The material selection, specific proportions of component dimensions, and process control are all key elements to obtain a cable meeting the overall requirements.

There is also the need for cables with low smoke and zero halogen (LSZH) properties. This characteristic places additional constraints on the design parameters, since the selection of materials is more limited.

PRIOR ART

Fiber cables protect the fibers from strain by various means. Since the length of the glass fiber is essentially "fixed," changes in cable length due to temperature changes, ageing of the cable materials, or outside mechanical forces needs to be controlled. To control changes in cable length to acceptable levels, a number of approaches and techniques have been used.

Loose tube cables are place fibers within a helix in the cable, as generally shown in FIGS. 1 and 2, and, as the cable length increases or decreases, the helix diameter of the fibers can correspondingly decrease or increase. The change in length of the helix, with a larger or smaller helix diameter, provides a range of cable lengths where the fibers are not under tensile or compressive strain, see FIG. 3. Tubes or jackets with larger inside diameters, or a shorter helix pitch, have a larger range of compression and elongation before the fibers are eventually strained. The range of cable elongations, without placing strain on the fiber, typically ranges from 0.05% to 2.0 percent.

For loose tube cables without a helix, as the cable components shrink longitudinally, the fibers within the tube or jacket will begin to acquire a curved or sinusoid configuration. However, once the amount of curvature reaches a critical point, the fiber is typically pressed against the inner surface of the tube or jacket, as generally shown in FIG. 4. This pressure is not uniform and typically leads to micro and macro bending of the internal optical fiber which, in turn, leads to a significant increase in optical losses along the length of the optical fiber. The ratio of the fiber length to the cable length is known as excess fiber length (EFL), and must remain below a critical value in order to avoid macro and microbending effects. The smaller the space provided for the fiber, the more critical it is to maintain a low and controlled excess fiber length.

The range of cable elongation, without placing strain on the optical fiber, ranges from about 0.05 to 0.2 percent, which is significantly less than stranded loose tubes. This reduction of the elongation range places significantly tighter constraints on the cable design as well as the material selection. This also leads to design and performance compromises, such as lower rated tensions, the need for additional strength members, or a reduction in the temperature range of operation of the cable. However, cables without any helical stranding offer significant advantages in both size and cost.

Various means have been developed to control the cable elongation during tension and compression as well as temperature changes by reinforcing the outer tube or jacket of the cable. One technique is to place rigid metal or resin reinforced fiberglass elements within the jacket of the cable, as generally shown in FIG. 5. However, the inclusion of strength members in the jacket or outer tube of the cable construction generally leads to an undesirable increase in cable diameter. Another disadvantage of the strength members located in the jacket or outer tube is a preferential bending direction, due to the asymmetric rigidity caused by the localized presence of the strength members.

There is also a desire to have non-helix loose tube cable(s) with more flexibility, which leads to including yarns, such as aramid yarns, as strength members instead of rigid rods of typically non-metallic composite structure. A key problem with using yarns as tensile strength members is that they have very little compression modulus, but very high tensile modulus. This lack of compression strength typically requires other techniques for controlling the amount the cable shrinks over time, or due to temperature changes. Known techniques include the proper choice of material properties, choosing materials with low shrinkage, and providing cable designs that provide sufficient compressive strength for avoiding crush forces.

Previous Attempts at Developing the Cable

Cable development included investigating low smoke zero halogen (LSZH) materials on the market which had desirable characteristics for product performance. Critical parameters for such products include low jacket shrinkage, sufficient flame resistance, high and low temperature bend performance, and characteristics to aid in meeting industry safety and flame standards.

In addition, the selected material must be capable of being processed on an extruder into a jacket or tubular construction. This includes processing without any breaks in the jacket for a relatively thin walled extrusion, not creating excessive barrel compression pressure based on a high material flame retardant fill ratio, and minimizing acquired material stresses resulting from an extrusion draw down process.

A key measure of the flame resistance of a material is its LOI. Materials which have a high LOI, e.g., a LOI of at least 30, for example, are more flame retardant and more likely to perform as required during industry flame resistance tests.

A variety of LSZH compounds were investigated from a number of different suppliers for use as a suitable jacket material. Various materials were dropped from consideration because such materials had lower LOI values than what was desired for flame resistance, e.g., a LOI value of equal to or below 30. Other materials were not considered because they had low hardness or flex modulus values, which could negatively affect impact and compression performance of the jacket. Of the remaining materials, a group of compounds were selected for cable trials and of these tested compounds, many failed due to problems such as either the inability to be able to form a thin wall jacket or failed due to extrusion inconsistencies, e.g., the extruded material has holes, tears or other imperfections in the jacket.

Material shrink back is also another obstacle that can lead to unsuccessful cable performance results, and it was determined that a low amount of shrink back is important in order to maintain the desired cable performance. It was noted that LSZH materials tend to acquire a high level of stress when the jacket is extruded during the extrusion process. As the material is drawn down out of the extrusion tooling at an initial outside diameter and a desired wall thickness, the material acquires a stressed state due to stretching of the molecular chains. These stresses are then normally locked into place when the jacket cools or is rapidly quenched during formation of the fiber optic cable. However, certain post extrusion conditions, such as temperature cycling of the cable across its storage and operating temperature range, cause these stresses to relax, which results in a longitudinal shrinking of the jacket. This shrinkage will increase the EFL beyond a critical point and can result in high optical losses in the cable. High, optical attenuation was observed with several of the material types used during the cable trials.

SUMMARY OF THE INVENTION

Wherefore, it is an object of the present invention to provide an improved fiber optic cable which is free of any halogens and has an exterior jacket shrinkage of about 3.5% or less and a LOI of at least 40 thereby overcome the above mentioned shortcomings and drawbacks associated with the prior art.

Another object of the present invention is to minimize shrinkage of the exterior jacket so as to avoid high optical attenuation and optical losses in the fiber optic cable.

A further object of the present invention is to provide a cable design that includes specific material properties and construction details in order to achieve the desired performance attributes, while still providing a minimum tube outer diameter.

Yet another object of the present invention is to provide a first jacket, for a single assembly construction, with a LOI of at least 50 and a flex modulus of about 40,000 psi. while provide the second jacket, for a multi assembly construction, with a slightly lower LOI of 35 or more and a flex modulus of about 30,000 psi due to the overall larger cable size and the preponderance of flame retardant materials compared to the relatively flammable optical fibers. For constructions containing a second jacket, the first jacketed cable can optionally have a first jacket with an LOI of 35 or more, and a flex modulus of about 30,000 psi.

The present invention also relates to a fiber optic cable comprising at least one subassembly, and the at least one subassembly comprising: between 1 to 12 optical fibers; a plurality of reinforcing strands which are each free of any halogens; a first jacket being free of any halogens and having a thickness of between about 0.254 to about 0.305 mm; and the first jacket surrounding and completely encasing the 1 to 12 optical fibers and the plurality of reinforcing strands to form the at least one subassembly; wherein the first jacket is manufactured from a material which has a limiting oxygen index (LOI) of at least 40 and a shrinkage of the first jacket being no greater than about 3.5%; the fiber optic cable has a crush resistance of at least 35N/cm, and increase of optical attenuation from −20 to 70° C. of less than 0.20 db/km at 1550 nm for non bend-resistant single mode fiber and meets requirements according to each of IEC 60332-3-24 (Flame Spread), IEC 61034-2 (Low smoke), and IEC 60754-1&2 (non-Halogen).

The present invention also relates to a fiber optic cable comprising at least one subassembly, and the at least one subassembly comprising: between 1 to 24 optical fibers; a plurality of reinforcing strands which are each free of any halogens; a first jacket being free of any halogens and having a thickness of between about 0.325 to about 0.489 mm; and the first jacket surrounding and completely encasing the 1 to 24 optical fibers and the plurality of reinforcing strands to form the at least one subassembly; wherein the first jacket is manufactured from a material which has a limiting oxygen index (LOI) of at least 40 (preferably 50) and a shrinkage of the first jacket being no greater than about 3.5%; the fiber optic cable has a crush resistance of at least 100N/cm, allows less than a 0.30 db/km increase of optical attenuation at 1550 nm for non bend-resistant single mode fiber from −20 to 70° C. and meets requirements according to each of IEC 60332-3-24 (Flame Spread), IEC 61034-2 (Low smoke), and IEC 60754-1&2 (non-Halogen); the reinforcing strands comprise 6×1420 denier aramid yarns (2-24 F 3 mm OD); and the fiber optic cable jacket has a flexural modulus of about 40,000 psi.

Lastly, the present invention relates to a fiber optic cable comprising an exterior second jacket surrounding and encasing a plurality of subassemblies, and each one of the plurality of subassemblies comprising: between 1 to 12 optical fibers; a plurality of reinforcing strands which are each free of any halogens; a first jacket being free of any halogens and having a thickness of between about 0.254 to about 0.305 mm; and the first jacket surrounding and completely encasing the 1 to 12 optical fibers and the plurality of reinforcing strands to form one of the subassemblies; wherein the first jacket and the exterior jacket are manufactured from a material which has a limiting oxygen index (LOI) of at least 35 (preferably 50) and a shrinkage of the first jacket and the exterior jacket both being no greater than about 3.0%; the fiber optic cable has a crush resistance of at least 100N/cm, allows less than a 0.24 db/km increase of optical attenuation from −20 to 70 C at 1550 nm for non bend-resistant single mode fiber and meets requirements according to each of IEC 60332-3-24 (Flame Spread), IEC 61034-2 (Low smoke), and IEC 60754-1&2 (non-Halogen); and a flexural modulus of the fiber optic cable jacket being about 30,000 psi.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 1 is a diagrammatic view showing a stranded loose tube fiber optic cable according to the prior art;

FIG. 2 is a detailed view of a stranded loose tube fiber optic cable according to the prior art;

FIG. 3 is a diagrammatic view diagrammatically showing the helical motion of fibers within stranded loose tube cables;

FIG. 4 is a diagrammatic view showing excess fiber length within a buffer tube;

FIG. 5 is a diagrammatic view showing a prior art technique for controlling the cable elongation during tension and compression by placing at least one rigid metal or resin reinforced fiberglass element within the jacket of the cable;

FIG. 6 is a diagrammatic view showing the result of a finite element analysis of the tube under light load conditions;

FIG. 7 is a diagrammatic view showing the result of a finite element analysis of the tube under medium load conditions;

FIG. 8 is a diagrammatic view showing the result of a finite element analysis of the tube under heavy load conditions;

FIG. 9 is a diagram showing the crush analysis for 2.0 mm diameter tube or jacket at four different levels of normalized force;

FIG. 10 is a diagram showing the crush analysis for 2.1 mm diameter tube or jacket at four different levels of normalized force;

FIG. 16 is a diagrammatic perspective view showing an end section of a 48 optical fiber embodiment of FIG. 14 with a portion of the exterior jacket removed.

DETAILED DESCRIPTION AND TEST RESULTS

Figure 11:
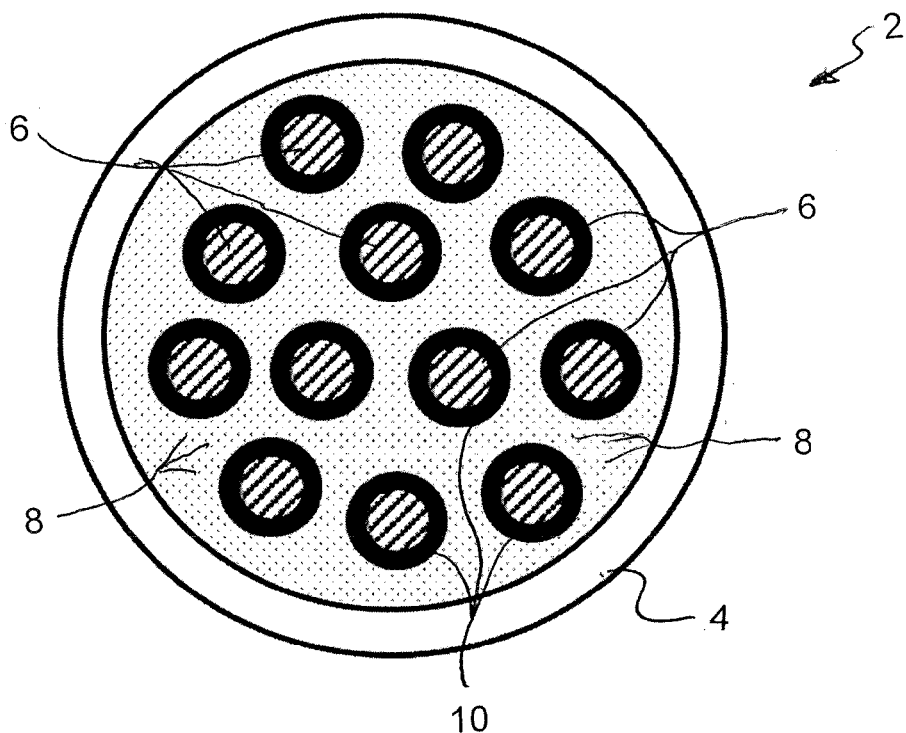
FIG. 11 is a diagrammatic cross sectional view showing an embodiment of the invention for a 12 optical fiber assembly.

The present invention will be understood by reference to the following detailed description, which should be read in conjunction with the appended drawings. It is to be appreciated that the following detailed description of various embodiments is by way of example only and is not meant to limit, in any way, the scope of the present invention.

The disclosure relates to a cable design that has a unique combination of performance attributes of zero halogen, controlled length dimension, sufficient flame performance, and sufficient crush strength which are all incorporated within a small, compact structure or optic cable assembly. It is desired to maintain the shape of the exterior tube or jacket as round as possible when subjected to external forces, particularly crush or compression forces. It is to be appreciated that the compression strength of the cable depends on the material properties as well as the tube or jacket dimensions.

It is also of interest to use materials, for forming the tube or jacket, that are low smoke, do not contain any halogen(s) (i.e., contain zero halogen(s)), and meet standardized flame tests. These types of materials tend to have different processing and physical properties than halogenated materials typically used to attain flame performance, and the selection of suitable materials is much more limited than those materials that contain one or more halogens. The tradeoffs in material design are difficult to achieve all of the desired properties which, in turn, limit the choices of the suitable materials for use as an exterior jacket for the optical fiber cable.

A minimum inner diameter of the tube or jacket, when exposed to a crush force, is needed to maintain performance of the optical fibers. FIGS. 6, 7 and 8 show the result of a finite element analysis of the tube or jacket under different three load conditions. The black double headed arrow in FIGS. 6 and 7 shows a reduced effective 'tube ID' when subjected to a light load (FIG. 6) and a medium load (FIG. 7), respectively, compared to the original tube ID in the circular original shape before being deformed due to the load. As diagrammatically shown in FIG. 8, when the tube or jacket experiences a heavy load, the effective tube ID reaches zero and the optical fibers are subjected to a damaging crush force.

The disclosure is directed at a cable design that includes specific material properties and construction details in order to achieve the desired performance attributes, while still providing a minimum outer diameter for the tube or jacket. An analysis was conducted to model the tube deformation with different compression loads, using the mechanical properties of the available LSZH type materials.

The results of this analysis is set forth in FIGS. 9 and 10. The analysis summarizes the finite element analysis of a tube or jacket subjected different levels of a normalized force per unit length (NF/L). An optimally small tube diameter is desired while still maintaining sufficient protection of the optical fibers from exterior crush forces.

It was discovered that tubes or jackets made with LSZH materials can be manufactured as small as 2 mm while still also maintaining protection against a conventional crush force. The range of optimum wall thicknesses is shown in FIGS. 9 and 10 reveal an optimum tube or jacket thickness is about 0.26 to 0.28 mm (see the dashed rectangular area). This wall thickness provides the most consistent inner dimension over a range of compression forces as well as still providing an inner diameter which is sufficient to accommodate and protect the optical fibers.

A thinner tube wall, than optimum wall thickness, would allow the inner diameter (ID) to decrease due to excessive crush when subjected to higher loads, while a thicker wall, than the optimum wall thickness, would be able to withstand higher loads but, in turn, reduces the available internal space for accommodating the optical fibers and the reinforcing yarns. It is to be appreciated that the optimum values depend on the physical strength of the material utilized for manufacture of the tube or jacket, and each material may have a different optimum value. The cable is optimized for the LSZH materials that also provide the desired parameters, such as minimizing shrink back and having sufficient flame and smoke performance for the resulting cable.

Material Shrinkage, Excess Fiber Length, and Fiber Tensile Strain

A key material property is shrink back after ageing of the optical fiber cable, which is typically a measure of the dimensional stability of the material over time. This shrinkage needs to be sufficiently small so as to avoid a high excess fiber length. Excessive fiber tensile strain, when the cable is subjected to tensile forces, is avoided by using yarn reinforcement and strands, such as aramid yarns, in the tube, jacket and cable constructions. However, such yarns generally have very little to no compressive strength in order to counteract the shrink forces generated by the other cable materials.

It is to be appreciated that typically some amount of EFL is designed into the cables to prevent excessive fiber tensile strain during use or installation. However, excessive material shrinkage can create an excess fiber length above a critical point.

Upon testing several zero halogen materials, for use as a tube or exterior jacket for the optical fiber cable, it was found that a very limited number of those materials exhibited each of: (1) a sufficiently low shrinkage, (2) good physical properties and (3) good flame performance. The test consists of subjecting the material to a temperature of +110° C. for two hours. The results of the compound shrink testing are shown in Tables 1 and 2 provided below.

However, it was found that material shrinkage of the LSZH compounds chosen for a successful design is on the order of 3.2% or less. Table 1 contains the shrinkage of materials that resulted in cables meeting the overall requirements for an acceptable tube or outer jacket for a single unit cable.

TABLE 1

| | Single Subassembly Cables; | | | | | | |
|---|---|---|---|---|---|---|---|
| Cable OD (mm) | 12F 3.0 mm 3.0 | 8F 3.0 mm 3.0 | 12F 3.0 mm 3.0 | 16F 3.0 mm 30 | 12F 2.0 mm | 12F 2.0 mm | 12F 2.0 mm |
| Material | Vendor A, material 1 | Vendor A, material 1 | Vendor A, material 1 | Vendor A, material 1 | Vendor B, material 3 | Vendor A, material 2 | Vendor B, material 4 |
| Component tested | Jacket | Jacket | Jacket | Jacket | Jacket | Jacket | Jacket |
| Average shrinkage | 4.75% | 5.41% | 4.63% | 4.39% | 8.47% | 8.07% | 2.40% |

Table 1 above contains the results of the shrinkage of various materials after being formed in to a single unit cable.

TABLE 2

| | Multi Subassembly Cables: | | |
|---|---|---|---|
| Cable Material | 72F 3.0 mm subs Vendor B, material 3 | 144F 3.0 mm subs Vendor B, material 3 | 96F 3.0 mm subs Vendor B, material 3 |
| Component tested | Outer jacket | Outer jacket | Outer jacket |
| Average shrinkage | 10.13% | 6.93% | 10.20% |

Table 2 contains the results of shrinkage of various materials after being formed in to a multi-unit cable.

TABLE 3

Tested to Telcordia GR-409 for jacket shrinkage
150 mm long samples with internal components removed. Tested to +110 C. for 2 hours

| | Single Unit Cables; TA 58350 for jacket | | | Multi Unit Cables: TA 58215 for outer jacket and subassemblies | | | Multi Unit: Subunit testing |
|---|---|---|---|---|---|---|---|
| | Single Unit: Jacket testing | | | Multi Unit: Outer jacket testing | | | |
| Cable OD (mm) | 12F 2.0 mm 2.0 | 12F 3.0 mm 3.0 | 24F 3.0 mm 3.0 | 144F Nano | 24F MU Nano | 144F 2.0 mm subs | 144F Nano 2.0 |
| Material | HCA Material A | HCA Material A | HCA Material A | HCA Material B | HCA Material B | HCA Material B | HCA Material B |
| Component tested | Jacket | Jacket | Jacket | Jacket | Jacket | Jacket | Subassemby |
| | Average % shrinkage | Average % shrinkage | Average % shrinkage | Average % shrinkage | Average % shrinkage | Average % shrinkage | Average % shrinkage |
| Avg | 3.21% | 1.15% | 2.31% | 1.04% | 1.29% | 2.67% | 2.10% |

Table 3 above contains jacket shrinkage values observed for cables that meet the key requirements of the present disclosure.

It is to be appreciated that shrinkage is only one of the important factors that will affect cable performance. Compression and impact jacket material strength resistance are a couple of other factors that are also important when selecting a suitable for the exterior jacket and for the overall cable design. A select group of the materials were also subjected to meet industry standard tests for mechanical performance in order to eliminate materials that did not contain all the necessary properties.

Temperature Cycling Data

A key measure of cable performance with a single tube or jacket design is attenuation change across a wide temperature range. The cable is rated for operation from −20 to +70° C., which results in material expansion and contraction over that temperature range. The stability of optical attenuation, particularly for a single mode fiber at 1550 nm for example, is a measure of the cable's ability to maintain dimensional control over the temperature range.

A mix of single and multimode fibers composed the components in each tube. Table 4, provided below, includes the highest attenuation change observed for the multi-mode and the single mode fibers within each tube or jacket over the temperature range of −20 to +70° C.

TABLE 4

| Fiber Type | Max. Change (dB) | Result |
|---|---|---|
| MM | 0.377 | Pass |
| SM | 0.086 | Pass |

MM = Multimode Fibers;
SM = Single Mode Fibers

According to Table 4, the worst case insertion loss change for all fibers within the cable of a 12 tube, 144 fiber cable.

TABLE 5

| Cable | Fiber Type | Average Initial (dB/km) | Maximum change (dB/km) | Result |
|---|---|---|---|---|
| AD | MM | 0.677 | 0.806 | Pass |
| [1] | SM | 0.244 | 0.106 | Pass |

Table 5—Worst case insertion loss change for all fibers within a 2.0 mm/12 fiber single core cable.

Flame Test Performance

Another key performance attribute, for the manufactured fiber optic cable, is flame performance and its content of any halogen(s). The manufactured optical fiber cable, according to the disclosure, must meets the requirements of each of: IEC 60332-3-24 (Flame Spread), IEC 61034-2 (Low Smoke), and IEC 60754-1&2 (Non-Halogen), in order to be acceptable.

Detail Description of Cable Construction

The single unit cable 2 comprises a group of optical fibers 6 which are all encased within a zero halogen, low smoke (exterior) first jacket 4. A plurality of separate and distinct reinforcing strands 8, such as aramid yarns, surround each one of the plurality of optical fibers 6. The plurality of reinforcing strands 8 are typically packaged as a yarn or a bundle of strands. The plurality of optical fibers 6 and the plurality of reinforcing strands 8 are all completely surrounded and encased within the tube or the first jacket 4. According to this embodiment, the outside diameter of the tube or the first jacket is about 2 mm. The plurality of reinforcing strands 8 are provided in order to increase the overall tensile strength of the manufactured fiber optic cable 2.

Several other constructions, each of which are discussed below in further detail, can be formed from the basic subassembly shown in FIG. 11. Each one of these subassemblies comprises the tube or first jacket (an exterior jacket in this embodiment) surrounding and encasing the plurality of optical fibers 6 and the plurality of reinforcing strands 8, while still resulting in a zero halogen, low smoke construction. It is to be appreciated that one or more generally round filler subassemblies 18', additional strengthen member(s) 20 and/or a rip cord 22 can also be encased and housed within the first jacket 4, as discussed below, and thereby form the subassembly. Further, it is to be appreciated that when additional optical fibers 6, in excess of 12 optical fibers 6, are contained within the first jacket (see FIG. 12 for example), the outside diameter of the tube or first jacket will typically be greater than 2 mm, i.e., 3 mm, in order to accommodate the additional optical fibers 6, reinforcing strands 8, etc., that are contained therein, as discussed below in further detail.

Turning now to FIG. 11, a detail description concerning the various components of a first embodiment or subassembly will now be discussed. As can be seen in this embodiment, the fiber optic cable 2 generally comprises an exterior first jacket 4 which surrounds and encases a variety of different internal components, each of which will be discussed below in further detail. The first jacket 4 is typically manufactured from a plastic material, such as blended polyolefins that contain flame retardant material which result in a relatively high limiting oxygen index, e.g., a LOI of at least 40 (preferably 50), that renders the exterior first jacket 4 resistant to being ignited when exposed to heat or an open flame. A suitable blended polyolefins material, for use in manufacture of the first jacket 4 (single assembly cable), is a proprietary formulation sold by Teknor Apex of 505 Central Avenue, Pawtucket, R.I. 02861 under the Halguard 58350 trade name. Another desired characteristic of the composition or material, for forming exterior first jacket 4, is that the composition or material must not contain or include any halogen(s) so that, in the unlikely event that the first jacket 4 was ever to ignite and burn, combustion of the first jacket 4 would not result in the generation of any toxic fumes. In some applications, the LOI can be 50 or greater in order to provide additional protection against igniting when the fiber optic cable 2 is exposed to heat or an open flame.

The exterior first jacket 4 typically has an optimum wall thickness of between about 0.254 to about 0.305 mm which is generally an adequate thickness in order to provide sufficient integrity for the manufactured fiber optic cable 2. In addition, it is important that the exterior first jacket 4, following manufacture thereof, have a total shrinkage of about 3.5% or less. One technique of adequately controlling the shrinkage of the first jacket 4 will be discussed below in further detail with respect to the process for manufacturing the fiber optic cable 2. It is also important that the first jacket 4 (or the fiber optic cable 2) have a flexural modulus of at least about 40,000 psi.

Figure 11A:
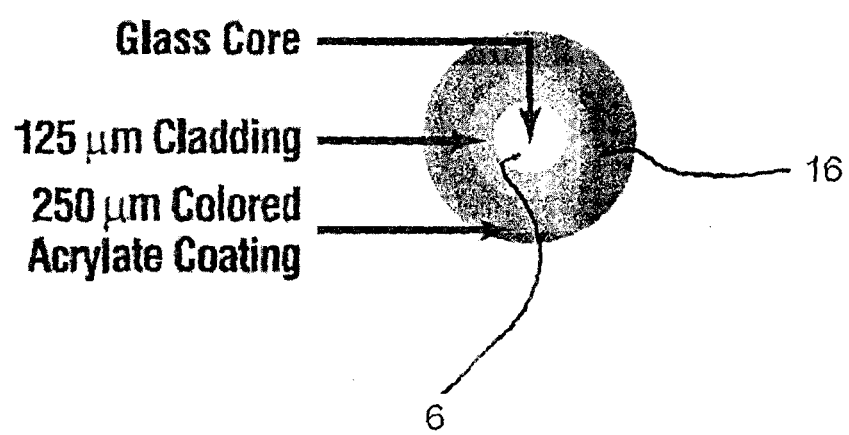
FIG. 11A is a diagrammatic cross sectional view of an optical fiber having two surrounding layers.

Also as generally shown in FIG. 11, the first jacket 4 completely surrounds and encases between 1 and 12 separate optical fibers 6, and each of the optical fibers 6 is each free of any halogen. As generally shown in FIG. 11A, each one of the optical fibers 6 typically has an outside diameter of about 125 μm. As is conventional in the art, each one of the optical fibers 6 is surrounded by an acrylate layer or coating 10 which has an outer diameter of 250 μm, for example. The layer or coating 10 is designed to protect the optical fiber 6 from being scratched or otherwise damaged during handling, manufacture and/or assembly of the fiber optic cable 2. It is to be appreciated, however, that such coatings are typically flammable and can readily ignite when exposed to sufficient heat.

Finally as shown in FIG. 11, the first jacket 4 also surrounds and encases a plurality of reinforcing strands 8, e.g., aramid yarn, which are each free of any halogen(s). Typically many hundreds of reinforcing strands 8 are utilized, depending upon the diameter and the size of the strands. The reinforcing strands 8 are surrounded and enclosed by the first jacket 4 along with the 1 and 12 separate optical fibers 6. The reinforcing strands 8 are generally arranged so as to occupy the same interior as the individual optical fibers 6. For the single subassembly shown in FIG.

11, the reinforcing strands 8 are assembled typically as 3×1420 denier aramid yarns (2-12 F 2 mm OD). The reinforcing strands 8 provide tensile strength for the optical fiber cable 2 and thereby assist with preventing the 1 and 12 separate optical fibers 6 from fracturing or breaking during handling, assembly and/or installation of the fiber optic cable 2. In a similar construction, 6×1420 denier aramid yarns can be utilized for a larger tube or jacket which has an outside diameter of 3.0 mm and can contain between 2 to 24 optical fibers (see FIG. 12 for example).

As generally shown in FIG. 11, the single subassembly forms the resulting fiber optic cable 2 and comprises (1) between 1 and 12 separate optical fibers 6, (2) a plurality of reinforcing strands 8, and (3) a first jacket 4 material which encases, surrounds and encloses each one of those components and also forms the exterior jacket for the fiber optic cable 2. Following assembly of the fiber optic cable 2, the fiber optic cable 2 has a crush resistance of at least 35N/cm, allows less than a 0.24 db/km increase of optical attenuation from −20 to 70° C. at 1550 nm for non bend-resistant single mode fiber and meets the requirements as set forth in each of: IEC 60332-3-24 (Flame Spread), IEC 61034-2 (Low smoke), and IEC 60754-1&2 (non-Halogen).

For the first jacket 4 to achieve a shrinkage of about 3.5% of less, it is first important that the initial outside diameter (OD) of the exterior first jacket 4 be relatively small during initial extruding of the first jacket 4, which is typically described as a low draw down ratio. That is, if the first jacket 4 is to have a final outside diameter of 2 mm, for example, then the outside diameter of the first jacket 4, during initial extrusion thereof form the extrusion machine, is typically no greater than 1½ to 3 times or so (e.g., the initial diameter of the exterior first jacket 4 may be 3 to 6 mm, for example) of the final 2 mm outside diameter of the first jacket 4 following manufacture of the fiber optic cable 2. The reason that this is important is because material, from which the first jacket 4 is extruded, typically has a tendency, when heated or otherwise exposed to heat, to revert back to its initial shape as discussed above. Accordingly, when the fiber optic cable 2 is heated or otherwise exposed to heat, the first jacket 4 tends shrink axially and, by minimizing the initial outside diameter of the jacket during initial extrusion of the first jacket 4, this in turn minimize the overall axial shrinkage of the exterior first jacket 4 so that a shrinkage of about 3.5% or less is achieved.

Importantly, the material itself must also have an inherently low amount of shrink back, and such materials combined with appropriate process techniques are required to obtain the necessarily low shrink back of the fabricated cable. This results in the need for careful screening and selection of appropriate compounds which result in the desired mechanical properties in the fabricated cable.

During manufacture of the optical fiber cable 2, the plurality of optical fibers 6 as well as the plurality of reinforcing strands 8 are assembled and combined with one another to form a combined bundle of fibers 6 and reinforcing strands 8. This formed combined bundle of fibers 6 or reinforcing strands 8 is then passed centrally through the interior space of the extruded initially larger diameter first jacket 4. As the first jacket 4, the plurality of optical fibers 6 and the plurality of reinforcing strands 8 are pulled together as a unit away from the extruder (not shown), the first jacket 4 gradually stretches and such stretching action of the first jacket 4 causes the first jacket 4 to gradually shrink, constrict and/or reduce in diameter about and around the combined bundle of fibers 6 and the reinforcing strands 8. Once the outside diameter of the first jacket 4 shrink/ constricts/reduces to a diameter of 2 mm, for example, then the first jacket 4 is rapidly cooled or quenched (e.g., with liquid) to solidify the first jacket 4 and prevent further alteration or modification of the outside diameter of the first jacket 4.

This process generally result in the first jacket 4 slightly compacting or compressing the plurality of optical fibers 6 and the plurality of reinforcing strands 8 into a generally circular configuration, as generally shown in FIG. 11. According to this embodiment, the first jacket 4, which also forms the exterior jacket, typically has a wall thickness in the range of 0.254 to 0.305 mm and a flexural modulus of in the range of 40,000 psi.

Figure 12:
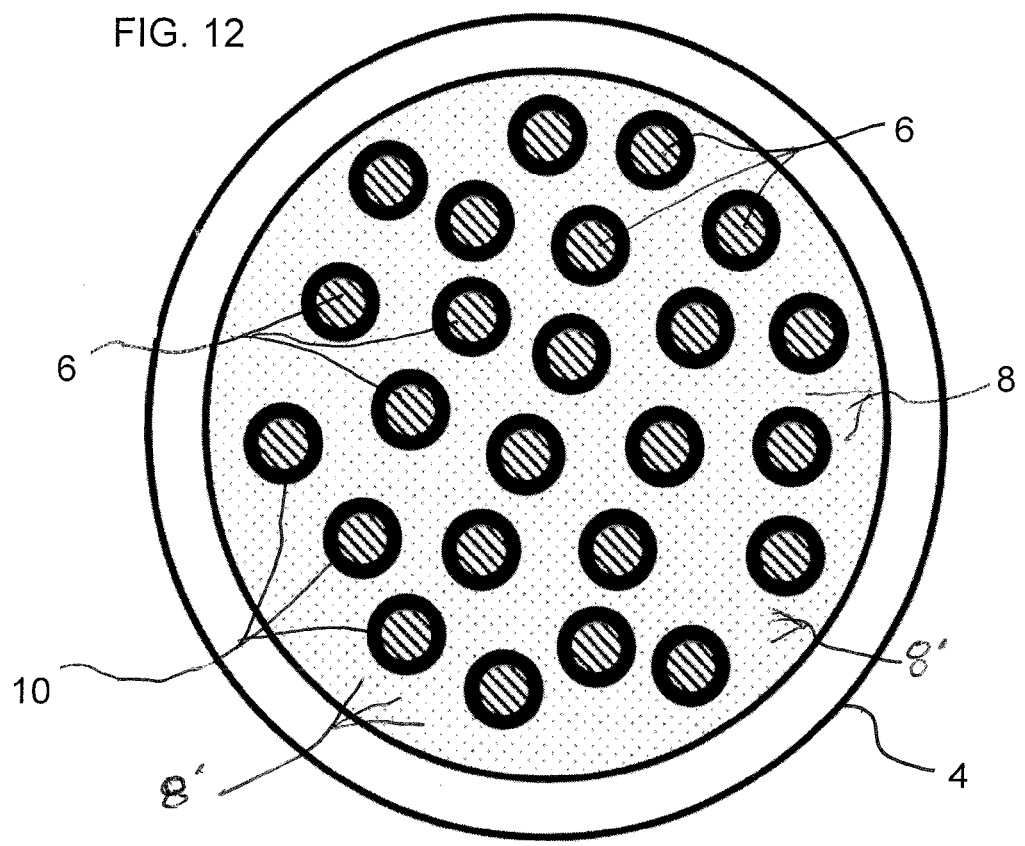
FIG. 12 is a diagrammatic cross sectional view showing a modification of the first embodiment of FIG. 11 which accommodates 24 optical fibers.

Turning now to FIG. 12, a detailed description concerning a modification of the first embodiment of the disclosure will now be provided. As this embodiment is similar to the previous embodiment in many respects, identical elements will be given identical reference numerals.

According to this modification, similar the FIG. 11, the fiber optic cable 2 generally comprises an exterior first jacket 4 which surrounds and encases a variety of different internal components, each of which will be discussed below in further detail. The first jacket 4 is typically manufactured from a plastic material, such as blended polyolefins that contain a flame retardant material that results in a relatively high LOI, e.g., a LOI of at least 40, that renders the exterior first jacket 4 resistant to being ignited when exposed to heat or an open flame. Another desired characteristic of the composition or material, for forming exterior first jacket 4, is that the composition or material must not contain or include any halogen(s) so that, in the unlikely event that the first jacket 4 was ever to ignite and burn, combustion of the first jacket 4 would not result in the generation of any toxic fumes. In some applications, the LOI can be 50 or greater in order to provide additional protection against igniting when the fiber optic cable 2 is exposed to heat or an open flame.

The exterior first jacket 4 typically has an optimum wall thickness of between about 0.325 to about 0.409 mm which is generally an adequate thickness in order to provide sufficient integrity for the manufactured fiber optic cable 2. In addition, it is important that the exterior first jacket 4, following manufacture thereof, has a total shrinkage of about 3.5% or less.

Also as generally shown in FIG. 12, the first jacket 4 completely surrounds and encases between 12 and 24 separate optical fibers 6 (24 enclosed optical fibers are shown in this Figure), and each of the optical fibers 6 is each free of any halogen. The first jacket 4 also surrounds and encases a plurality of reinforcing strands 8, e.g., aramid yarn, which are each free of any halogen(s). Typically many hundreds of reinforcing strands 8 are utilized, depending upon the diameter and the size of the strands. The reinforcing strands 8 are surrounded and enclosed by the first jacket 4 along with the 24 separate optical fibers 6. The reinforcing strands 8 are generally arranged so as to occupy the same interior as the individual optical fibers 6. For the single subassembly shown in FIG. 12, the reinforcing strands 8 are assembled typically as either 3×1420 denier aramid yarns (2-12 F 2 mm OD) or 6×1420 denier aramid yarns (2-24 F 3 mm OD) are utilized. The reinforcing strands 8 provide tensile strength for the optical fiber cable 2 and thereby assist with preventing the 24 separate optical fibers 6 from fracturing or breaking during handling, assembly and/or installation of the fiber optic cable 2.

As generally shown in FIG. 12, the single subassembly forms the fiber optic cable 2 and comprises (1) between 12 and 24 separate optical fibers 6, (2) a plurality of reinforcing strands 8, and (3) a first jacket 4 material which encases, surrounds and encloses each one of those components and also forms the exterior jacket for the fiber optic cable 2. Following assembly of the fiber optic cable 2, the fiber optic cable 2 has a crush resistance of at least 35N/cm, allows less than a 0.24 db/km increase of optical attenuation from −20 to 70° C. at 1550 nm for non bend-resistant single mode fiber and meets the requirements as set forth in each of IEC 60332-3-24 (Flame Spread), IEC 61034-2 (Low smoke), and IEC 60754-1&2 (non-Halogen).

For the first jacket 4 to achieve a shrinkage of about 3.5% of less, it is first important that the initial outside diameter (OD) of the exterior first jacket 4 be relatively small during initial extruding of the first jacket 4, which is typically described as a low draw down ratio as discussed above. That is, if the first jacket 4 is to have a final outside diameter of 3 mm, for example, then the outside diameter of the first jacket 4, during initial extrusion thereof form the extrusion machine, is typically no greater than 1½ to 3 times or so (e.g., the initial diameter of the exterior first jacket 4 may be 4.5 to 9 mm, for example) of the final 3 mm outside diameter of the first jacket 4 following manufacture of the fiber optic cable 2 and, in turn, minimize the overall axial shrinkage of the exterior first jacket 4 so that a shrinkage of about 3.5% or less is achieved.

During manufacture of the optical fiber cable 2, the plurality of optical fibers 6 as well as the plurality of reinforcing strands 8 are assembled and combined with one another to form a combined bundle of fibers 6 and reinforcing strands 8. This formed combined bundle of fibers 6 and reinforcing strands 8 is then passed centrally through the interior space of the initially larger diameter first jacket 4. As the first jacket 4, the plurality of optical fibers 6 and the plurality of reinforcing strands 8 are pulled together as a unit away from the extruder (not shown), the first jacket 4 gradually stretches and such stretching action of the first jacket 4 causes the first jacket 4 to gradually shrink, constrict and/or reduce in diameter about and around the combined bundle of fibers 6 or reinforcing strands. As the outside diameter of the first jacket 4 shrink/constricts/reduces to a diameter of 3 mm, for example, then the first jacket 4 is rapidly cooled or quenched (e.g., with liquid) to solidify the first jacket 4 and prevent further alteration of the outside diameter of the first jacket 4.

This process generally result in the first jacket 4 slightly compacting or compressing the plurality of optical fibers 6 and the plurality of reinforcing strands 8 into a generally circular configuration, as generally shown in FIG. 12. According to this embodiment, the first jacket 4, which also forms the exterior jacket in this embodiment, typically has a wall thickness in the range of 0.254 to 0.305 mm and a flexural modulus of in the range of 40,000 psi.

Figure 13:
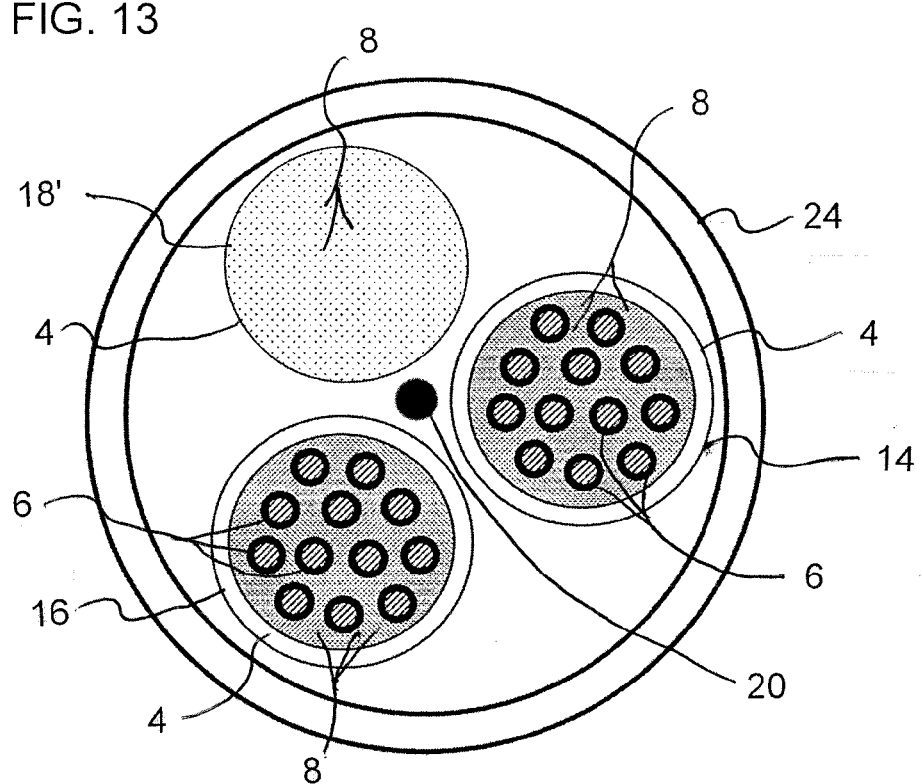
FIG. 13 is a diagrammatic cross sectional view showing a second embodiment of the invention for a 24 optical fiber assembly.

Turning now to FIG. 13, a detailed description concerning a second embodiment of the disclosure will now be provided. As this embodiment is similar to the previous embodiment in many respects, identical elements will be given identical reference numerals.

According to this embodiment, first and second subassemblies 14, 16, each of which is generally formed as described above with respect to the description relating to FIG. 11, are first assembled generally independently of one another. As shown, the first subassembly 14 includes a first jacket 4 that surrounds and encases 12 optical fibers 6 while the second subassembly 16 also includes a first jacket 4 that surrounds and encases an additional 12 optical fibers 6. The first jacket 4, of each one of the first and the second subassemblies 14, 16, also surrounds and encases a plurality of reinforcing strands 8 which are arranged so as to separate and space apart each one of the individual optical fibers 6 from any adjacent optical fiber(s) 6 contained within that respective subassembly 14 or 16. Each one of the reinforcing strands 8 may consist of 3×1420 denier aramid yarns. The reinforcing strands 8 provide tensile strength for the first and the second subassemblies 14, 16 and thereby assist with preventing the 1 and 12 separate optical fibers 6 from fracturing or breaking during handling, assembly and/or installation of the subassemblies 14, 16.

In addition, as generally shown in FIG. 13, this embodiment includes a third subassembly 18' which does not contain any optical fibers. That is, the first jacket 4 of the third subassembly 18' merely surrounds and encases a plurality of reinforcing strands 8 but does not contain any optical fibers. The third subassembly 18' is merely provided as a filler subassembly which assists with accommodating 24 optical fibers 6, for example, within the optical fiber cable 2' while still maintaining the desired integrity, e.g., crush resistance and other desired physical properties, of the optical fiber cable 2'.

As also shown in FIG. 13, this embodiment may also include a reinforcing spine 20 which extends centrally along the axial length of the optical fiber cable 2' and the reinforcing spine 20 provides additional structural integrity and rigidity thereto. The reinforcing spine 20 can be manufactured from a material with both tensile and compression strength, such as an epoxy filled fiberglass rod. Other materials, with both tensile and compression strength, can also be used. The reinforcing spine 20 typically has a diameter of between 0.4 to 2 mm.

In addition, as diagrammatically shown in this Figure, a conventional rip cord 22, consisting of a nylon, polyester, or aramid yarn, can be assembled with the above components to form part of the optical fiber cable 2'. The rip cord 22 generally assists a user with ripping or tearing an elongate section of the second jacket, during installation of the optical fiber cable 2', to provide access to either the subassemblies 14, 16, 18' and/or one or more of the optical fibers 6. As both the reinforcing spine 20 and rip cord 22 are conventional and well known in the art, a further detailed discussion concerning either of those components is not provided.

According to this embodiment, the exterior (second) jacket 24 surrounds and encases each one of the first, the second and the third subassemblies 14, 16, 18' as well as the central reinforcing spine 20 and the rip cord 22 along with the plurality of exterior jacket reinforcing strands 8'. As generally shown, the plurality of exterior jacket reinforcing strands 8' are generally arranged so as to separate and space apart each one of the three subassemblies 14, 16, 18' from any adjacent subassembly(ies), and also separate and space apart each one of the three subassemblies 14, 16, 18' from the central reinforcing spine 20 and/or the rip cord 22.

Following assembly of the multi assembly fiber optic cable 2', the cable 2' achieves a crush resistance of at least 100N/cm, allows less than a 0.24 db/km increase of optical attenuation from −20 to 70° C. at 1550 nm for non bend-resistant single mode fiber and meets the requirements as set forth in each of: IEC 60332-3-24 (Flame Spread), IEC 61034-2 (Low smoke), and IEC 60754-1 &2 (non-Halogen). In addition, each of the first and the exterior (second) jackets 4, 24 are manufactured from a material have a LOI of at least 35, a shrinkage of both the first and the second jackets being no greater than about 3.0% and a flexural modulus of the fiber optic cable jacket is at least about 30,000 psi.

Since this embodiment includes both first and exterior (second) jackets 4, 24, it is to be appreciated that the wall thickness of each one of the first and exterior (second) jackets 4, 24 can be reduced somewhat while still providing the same desired level of ignition protection for the optical fibers 6. The first jacket 4 typically has a wall thickness in the range of 0.254 to 0.305 mm and a flexural modulus of in the range of 30,000 psi while the exterior (second) jacket 24 typically has a wall thickness in the range of 0.8 to 1.8 mm and a flexural modulus of in the range of 30,000 psi. Both the first and the exterior jackets 4, 24 (multi assembly cable) are typically manufactured from a plastic material, having a slightly different ratio of blended polyolefins, sold by Teknor Apex of 505 Central Avenue, Pawtucket, R.I. 02861 under the Halguard 58215 trade name.

Figure 14:
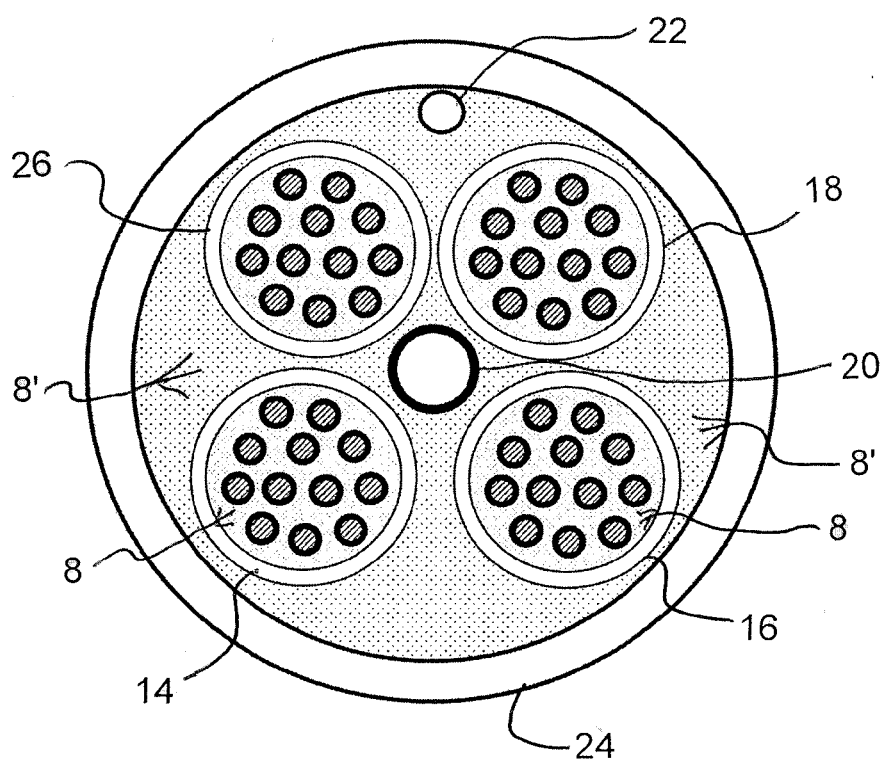
FIG. 14 is a diagrammatic cross sectional view showing a third embodiment of the invention for a 48 optical fiber assembly.

Turning now to FIG. 14, a detailed description concerning a third embodiment of the disclosure will now be provided. As this embodiment is similar to the previous embodiments in many respects, identical elements will be given identical reference numerals.

According to this embodiment, first, second, third and fourth subassemblies 14, 16, 18, 26 each of which is generally formed as described above with respect to FIG. 11, are first assembled generally independently of one another. As shown, the first subassembly 14 includes a first jacket 4 that surrounds and encases 12 optical fibers 6, the second sub 16 unit includes a first jacket 4 that surrounds and encases 12 optical fibers 6, the third subassembly 18 includes a first jacket 4 that surrounds and encases 12 optical fibers 6 while the fourth subassembly 26 also includes a first jacket 4 that surrounds and encases an additional 12 optical fibers 6. The first jacket 4, of each one of the first, the second, the third and the fourth subassemblies 14, 16, 18, 26, also surrounds and encases a plurality of reinforcing strands 8 which are arranged so as to separate and space apart each one of the individual optical fibers 6 from any adjacent optical fiber(s) 6 contained within that subassembly. Each one of the reinforcing strands 8 is either typically 3×1420 denier aramid yarns (2-12 F 2 mm OD) or 6×1420 denier aramid yarns (2-24 F 3 mm OD). The reinforcing strands 8 provide tensile strength for the fiber optic cable 2' and thereby assist with preventing the 1 and 12 separate optical fibers 6 from fracturing or breaking during handling, assembly and/or installation of the fiber optic cable 2'.

As also shown in FIG. 14, this embodiment may also include a reinforcing spine 20 which extends centrally along the axial length of the optical fiber cable 2' and the reinforcing spine 20 provides additional structural integrity and rigidity for the fiber optic cable 2'. The reinforcing spine 20 can be manufactured from a material with both tensile and compression strength, such as an epoxy filled fiberglass rod. Other materials, with both tensile and compression strength, can also be used. The reinforcing spine 20 typically has a diameter of between 0.4 to 2 mm.

In addition, as diagrammatically shown in this Figure, a conventional rip cord 22 can be assembled with the above components to form part of the optical fiber cable 2'. The rip cord 22 generally assists a user with ripping or tearing an elongate section of the exterior (second) jacket 24, during installation of the optical fiber cable 2', to provide access to subassemblies 14, 16, 18, 26 and/or one or more of the optical fibers 6.

According to this embodiment, the exterior (second) jacket 24 surrounds and encases each one of the first, the second, the third and the fourth subassemblies 14, 16, 18, 26 as well as the central reinforcing spine 20 and the rip cord 22 along with the plurality of exterior jacket reinforcing strands 8'. As generally shown, the plurality of exterior jacket reinforcing strands 8' are generally arranged so as to separate and space apart each one of the four subassemblies 14, 16, 18, 26 from any adjacent subassembly(ies) 14, 16, 18, 26, and also separate and space apart each one of the four subassemblies 14, 16, 18, 26 from the central reinforcing spine 20 and/or the rip cord 22.

Following assembly of the multi assembly fiber optic cable 2', the cable 2' achieves a crush resistance of at least 100N/cm, allows less than a 0.24 db/km increase of optical attenuation from −20 to 70° C. at 1550 nm for non bend-resistant single mode fiber and meets the requirements as set forth in each of: IEC 60332-3-24 (Flame Spread), IEC 61034-2 (Low smoke), and IEC 60754-1&2 (non-Halogen). In addition, the composition for forming both the first and the exterior (second) jackets 4, 24 has a LOI of at least 35, a shrinkage of both the first and the exterior (second) jackets 4, 24 being no greater than about 3.0% and a flexural modulus of the fiber optic cable jacket is about 30,000 psi.

Since this embodiment includes both first and exterior (second) jackets 4, 24, it is to be appreciated that the flame resistance of each one of the first and exterior (second) jackets 4, 24 can be reduced somewhat while still providing the same desired level of protection to the optical fibers 6. Typically, the first jacket 4 typically has a wall thickness in the range of 0.205 to 0.305 mm and a flexural modulus of in the range of 30,000 psi while the exterior (second) jacket 24 typically has a wall thickness in the range of 0.4 to 2.0 mm and a flexural modulus of in the range of 40,000 psi.

A diagrammatic perspective view of an end section of the 48 optical fiber arrangement, of FIG. 14, is shown in FIG. 16. A portion of the exterior jacket is removed in this Figure to show the four subassemblies 14, 16, 18, 26, the optical fibers 6, and the exterior jacket reinforcing strands 8', while the central reinforcing spine 20 and the rip cord 22 are not visible in this Figure.

Figure 15:
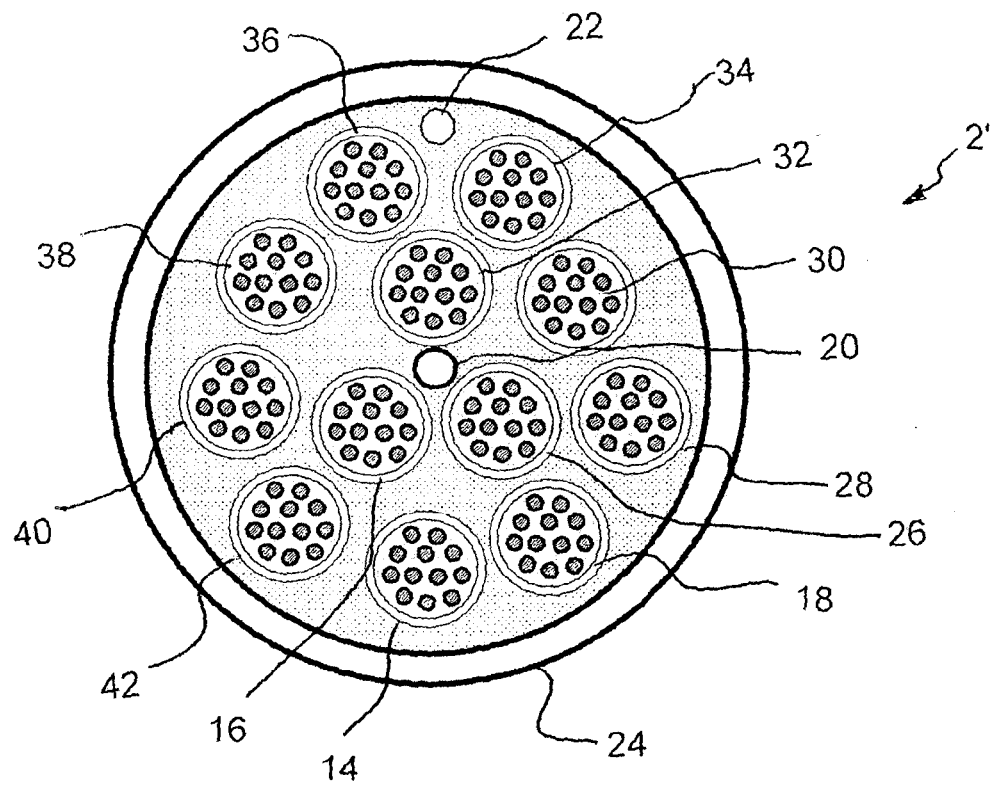
FIG. 15 is a diagrammatic cross sectional view showing a fourth embodiment of the invention for a 144 optical fiber assembly.

Turning now to FIG. 15, a detailed description concerning a fourth embodiment of the disclosure will now be provided. As this embodiment is similar to the previous embodiment in many respects, identical elements will be given identical reference numerals.

According to this embodiment, first, second, third, fourth, fifth, sixth, seventh, eighth, ninth, tenth, eleventh and twelfth subassemblies 14, 16, 18, 26, 28, 30, 32, 34, 36, 38, 40, 42, each of which is generally formed as described above with respect to FIG. 11, are first assembled generally independently of one another. As shown, the first subassembly 14 includes a first jacket 4 that surrounds and encases 12 optical fibers 6, the second subassembly 16 includes a first jacket 4 that surrounds and encases 12 optical fibers 6, the third subassembly 18 includes a first jacket 4 that surrounds and encases 12 optical fibers 6, the fourth subassembly 26 also includes a first jacket 4 that surrounds and encases an additional 12 optical fibers 6, the fifth subassembly 28 includes a first jacket 4 that surrounds and encases 12 optical fibers 6, the sixth subassembly 30 includes a first jacket 4 that surrounds and encases 12 optical fibers 6, the seventh subassembly 32 includes a first jacket 4 that surrounds and encases 12 optical fibers 6, the eight subassembly 34 also includes a first jacket 4 that surrounds and encases an additional 12 optical fibers 6, the ninth subassembly 36 includes a first jacket 4 that surrounds and encases 12 optical fibers 6, the tenth subassembly 38 includes a first jacket 4 that surrounds and encases 12 optical fibers 6, the eleventh subassembly 30 includes a first jacket 4 that surrounds and encases 12 optical fibers 6, while the twelfth subassembly 42 also includes a first jacket 4 that surrounds and encases an additional 12 optical fibers 6.

The first jacket 4, of each one of the first, the second, the third, the fourth, the fifth, the sixth, the seventh, the eighth, the ninth, the tenth, the eleventh and the twelfth subassemblies 14, 16, 18, 26, 28, 30, 32, 34, 36, 38, 40, 42, also surrounds and encases a plurality of reinforcing strands 8 which are arranged so as to separate and space apart each one of the individual optical fibers 6 from any adjacent optical fiber(s) 6 contained within that respective subassembly. Each one of the reinforcing strands 8 is either typically 3×1420 denier aramid yarns (2-12 F 2 mm OD) or 6×1420 denier aramid yarns (2-24 F 3 mm OD). The reinforcing strands 8 provide tensile strength for the respective subassemblies 14, 16, 18, 26, 28, 30, 32, 34, 36, 38, 40 or 42 and thereby assist with preventing the 1 and 12 separate optical fibers 6 accommodated therein from fracturing or breaking during handling, assembly and/or installation of the respective subassemblies 14, 16, 18, 26, 28, 30, 32, 34, 36, 38, 40 or 42.

As also shown in FIG. 15, this embodiment may also include a reinforcing spine 20 which extends centrally along the axial length of the optical fiber cable 2' and the reinforcing spine 20 provides additional structural integrity and rigidity the fiber optic cable 2'. The reinforcing spine 20 can be manufactured from a material with both tensile and compression strength, such as an epoxy filled fiberglass rod. Other materials, with both tensile and compression strength, can also be used. The reinforcing spine 20 typically has a diameter of between 0.4 to 2 mm.

In addition, as diagrammatically shown in this Figure, a conventional rip cord 22 can be assembled with the above components to from part of the optical fiber cable 2'. The rip cord 22 generally assists a user with ripping or tearing an elongate section of the exterior (second) jacket 24, during installation of the optical fiber cable 2', to provide access to subassemblies 14, 16, 18, 26, 28, 30, 32, 34, 36, 38, 40, 42 and/or the optical fibers 6.

According to this embodiment, the exterior second jacket 24 surrounds and encases each one of the first, the second, the third, the fourth, the fifth, the sixth, the seventh, the eighth, the ninth, the tenth, the eleventh and the twelfth subassemblies 14, 16, 18, 26, 28, 30, 32, 34, 36, 38, 40, 42 as well as the central reinforcing spine 20 and the rip cord 22 along with the plurality of exterior jacket reinforcing strands 8'. As generally shown, the plurality of exterior jacket reinforcing strands 8' are generally arranged so as to separate and space apart each one of the twelve subassemblies 14, 16, 18, 26, 28, 30, 32, 34, 36, 38, 40, 42 from any adjacent subassembly(ies), and also separate and space apart each one of the twelve subassemblies 14, 16, 18, 26, 28, 30, 32, 34, 36, 38, 40, 42 from the central reinforcing spine 20 and/or the rip cord 22.

Following assembly of the multi assembly fiber optic cable 2' of FIG. 15, the cable 2' achieves a crush resistance of at least 100N/cm, allows less than a 0.24 db/km increase of optical attenuation from −20 to 70° C. at 1550 nm for non bend-resistant single mode fiber and meets the requirements as set forth in each of: IEC 60332-3-24 (Flame Spread), IEC 61034-2 (Low smoke), and IEC 60754-1&2 (non-Halogen). In addition, both the first and the exterior (second) jacket materials 4, 24 have a LOI of at least 35, a shrinkage of both the first and the second jackets being no greater than about 3.0% and a flexural modulus of both of the jackets is about 30,000 psi.

While the fiber optic cable 2' is described above is having either one, two, four or twelve separate subassemblies 14, 16, 18, 26, 28, 30, 32, 34, 36, 38, 40, 42, it is to be appreciated that the total number of subassemblies that are combined with one another to form the fiber optic cable 2' can vary, from application to application, depending upon the particular optical fiber needs without departing from the spirit and scope of the present invention. In addition, while the appended drawings generally show 12 optical fibers 6 being surrounded and encased by the first jacket 4, it is to be appreciated that either more than twelve or less than twelve optical fibers 6 may be surrounded and encased by the first jacket 4, depending upon the particular application, without departing from the spirit and scope of the present invention.

Since this embodiment includes both first and second jackets 4, 24, it is to be appreciated that the flame resistance of each one of the first and exterior (second) jacket 4, 24 may be reduced somewhat was still providing the same desired level of protection to the optical fibers 6 since the comparatively flammable fiber coating is much smaller proportion of the cable. Typically, the first jacket 4 typically has a wall thickness in the range of 0.205 to 0.305 mm and a flexural modulus of in the range of 30,000 psi while the exterior (second) jacket 24 typically has a wall thickness in the range of 0.4 to 2.0 mm and a flexural modulus of in the range of 30,000 psi.

Further details concerning various other embodiments of the disclosure are set forth in Table 6 below.

TABLE 6

| | | | | TUBE OD | | CABLE OD | | RECOMMENDED MAXIMUM LOADS | | | | CABLE WEIGHT | |
| | | | | | | | | INSTALL | | OPERATION | | | |
| | FIBERS | FIBERS/ TUBE | TUBE LAYOUT | in. | mm | in. | mm | lbs | N | lbs | N | lbs/kft | Kg/Km |
| --- | --- | --- | --- | --- | --- | --- | --- | --- | --- | --- | --- | --- | --- |
| SPECIFICATIONS | 24 | 12 | 2 + 2F × CSM | 0.079 | 2.0 | 0.315 | 8.0 | 300 | 1335 | 90 | 401 | 36.8 | 54.8 |
| BY | 36 | 12 | 3 + 1F × CSM | 0.079 | 2.0 | 0.315 | 8.0 | 300 | 1335 | 90 | 401 | 37.4 | 55.7 |
| FILTER | 48 | 12 | 4 × CSM | 0.079 | 2.0 | 0.315 | 8.0 | 300 | 1335 | 90 | 401 | 38.0 | 56.6 |
| COUNT | 72 | 12 | 6 × CSM | 0.079 | 2.0 | 0.346 | 8.8 | 300 | 1335 | 90 | 401 | 47.5 | 70.7 |
| | 96 | 12 | 8 × CSM | 0.079 | 2.0 | 0.388 | 9.9 | 300 | 1335 | 90 | 401 | 65.1 | 96.9 |
| | 144 | 12 | 9 × 3 × CSM | 0.079 | 2.0 | 0.440 | 11.2 | 300 | 1335 | 90 | 401 | 64.6 | 96.1 |

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

|  | 2 mm single tube cable | use with second jacket | Second jacket material | 3 mm single tube for 24 fiber |
|---|---|---|---|---|
| insensitive delta db at 1550 nm | 0.2 | 0.2 | 0.2 | 0.3 |
| patent spec | 40 | 35 | 35 | 40 |
| data sheet | 53 | 38 | 38 | 53 |
| patent spec | 40,000 | 30000 | 30000 | 40,000 |
| Flex mod in material datasheet | 43700 | 29200 | 29200 | 43700 |
| Compound number | TA 58350 | TA 58215 | TA 58215 | TA 58350 |
| Wall thickness range-tube | .254-.305 mm | .254-.305 mm | .254-.305 mm | .325-.409 mm |
| Wall thickness range-second jacket | NA | .4-2 mm | .4-2 mm | NA |
| Jacket Shrinkage Max | 3.50% | 3% | 3% | 3.50% |

Wherefore, we claim:

1. A fiber optic cable comprising at least one subassembly, and the at least one subassembly comprising:
   between 1 to 12 optical fibers;
   a plurality of reinforcing strands which are each free of any halogens;
   a first jacket being free of any halogens and having a thickness of between about 0.254 to about 0.305 mm; and
   the first jacket surrounding and completely encasing the 1 to 12 optical fibers and the plurality of reinforcing strands to form the at least one subassembly;
   wherein the first jacket is manufactured from a material which has a limiting oxygen index (LOI) of at least 40 and a shrinkage of the first jacket being no greater than about 3.5%;
   the fiber optic cable has a crush resistance of at least 35N/cm, allows less than a 0.24 db/km increase of optical attenuation from −20 to 70° C. at 1550 nm for non bend-resistant single mode fiber and meets requirements according to each of IEC 60332-3-24 (Flame Spread), IEC 61034-2 (Low smoke), and IEC 60754-1&2 (non-Halogen); and
   the first jacket has a flexural modulus of about 40,000 psi.

2. The fiber optic cable according to claim 1, wherein the fiber optic cable only comprises a single subassembly and the first jacket forms both an exterior jacket of the subassembly and an exterior jacket for the fiber optic cable, and the fiber optic cable has an outside diameter of about 2 mm.

3. The fiber optic cable according to claim 2, wherein the plurality of reinforcing strands increase a tensile strength for the fiber optic cable and assist with preventing the plurality of optical fibers from fracturing or breaking during handling, assembly and/or installation of the fiber optic cable.

4. The fiber optic cable according to claim 2, wherein the reinforcing strands are generally arranged to separate and space apart each one of the individual optical fibers from any adjacent optical fiber and from the first jacket.

5. The fiber optic cable according to claim 2, wherein the reinforcing strands comprise 3×1420 denier aramid yarns (2-12 F 2 mm OD).

6. The fiber optic cable according to claim 2, wherein the first jacket is manufactured from a blended polyolefin which is devoid of any halogenated component.

7. The fiber optic cable according to claim 1, wherein the fiber optic cable comprises a plurality of subassemblies and each one of the plurality of subassemblies is surrounded and encased by an exterior jacket, and the exterior jacket of the fiber optic cable has an outside diameter of between about 4 mm and about 12 mm.

8. The fiber optic cable according to claim 7, wherein the fiber optic cable comprises two subassemblies and at least one filler subassembly, a first jacket of the filler subassembly surrounds and encases a plurality of reinforcing strands but does not encase any optical fibers, and the exterior jacket of the fiber optic cable surrounds and encases the two subassemblies and the filler subassembly as well as exterior jacket reinforcing strands.

9. The fiber optic cable according to claim 8, wherein the exterior jacket reinforcing strands facilitate separating and spacing apart the two subassemblies and the filler subassembly from one another and from the exterior jacket.

10. The fiber optic cable according to claim 7, wherein the fiber optic cable further comprises at least one of:
   a reinforcing spine which extends centrally along an axial length of the fiber optic cable within the exterior jacket, and the reinforcing spine provides additional structural integrity and rigidity to the fiber optic cable; and/or
   the exterior jacket surrounds and encases a rip cord, and the rip cord assists a user with ripping or tearing an elongate portion of the exterior jacket in order to provide access to at least one of the plurality of subassemblies or the optical fibers.

11. The fiber optic cable according to claim 7, wherein each of the first jackets and the exterior jacket are both manufactured from a blended polyolefin which is devoid of any halogenated component, and the exterior jacket has a wall thickness of from 0.4 to 2.0 mm.

12. The fiber optic cable according to claim 7, wherein the fiber optic cable comprises at least first, second, third and fourth subassemblies, and the exterior jacket surrounds and encases the first, the second, the third and the forth subassemblies.

13. The fiber optic cable according to claim 12, wherein the exterior jacket reinforcing strands facilitate separating and spacing apart the first, the second, the third and the forth subassembly from one another and from the exterior jacket.

14. The fiber optic cable according to claim 12, wherein each of the first jackets and the exterior jacket are manufactured from a blended polyolefin which is devoid of any halogenated component, and the exterior jacket has a wall thickness of from 0.4 to 2.0 mm.

15. The fiber optic cable according to claim 12, wherein the fiber optic cable further comprises at least one of:
   a reinforcing spine which extends centrally along an axial length of the fiber optic cable within the exterior jacket, and the reinforcing spine provides additional structural integrity and rigidity to the fiber optic cable; and/or
   the exterior jacket surrounds and encases a rip cord, and the rip cord assists a user with ripping or tearing an elongate portion of the exterior jacket in order to provide access to at least one of the plurality of subassemblies or the optical fibers.

16. The fiber optic cable according to claim 7, wherein the fiber optic cable comprises first, second, third, fourth, fifth, sixth, seventh, eighth, ninth, tenth, eleventh and twelfth subassemblies, and the exterior jacket surrounds and encases the first, the second, the third, the fourth, the fifth, the sixth, the seventh, the eighth, the ninth, the tenth, the eleventh and the twelfth subassemblies.

17. The fiber optic cable according to claim 16, wherein the exterior jacket reinforcing strands facilitate separating and spacing apart the first, the second, the third, the fourth, the fifth, the sixth, the seventh, the eighth, the ninth, the tenth, the eleventh and the twelfth subassemblies from one another and from the exterior jacket; and each of the first jackets and the exterior jacket are manufactured from a blended polyolefin which is devoid of any halogenated component, and the exterior jacket has a wall thickness of from 0.4 to 2.0 mm.

18. The fiber optic cable according to claim 16, wherein the fiber optic cable further comprises at least one of:

a reinforcing spine which extends centrally along an axial length of the fiber optic cable within the exterior jacket, and the reinforcing spine provides additional structural integrity and rigidity to the fiber optic cable; and/or the exterior jacket surrounds and encases a rip cord, and the rip cord assists a user with ripping or tearing an elongate portion of the exterior jacket in order to provide access to at least one of the plurality of subassemblies or one of the optical fibers.

19. A fiber optic cable comprising at least one subassembly, and the at least one subassembly comprising:

between 1 to 24 optical fibers;

a plurality of reinforcing strands which are each free of any halogens;

a first jacket being free of any halogens and having a thickness of between about 0.325 to about 0.489 mm; and the first jacket surrounding and completely encasing the 1 to 24 optical fibers and the plurality of reinforcing strands to form the at least one subassembly;

wherein the first jacket is manufactured from a material which has a limiting oxygen index (LOI) of at least 40 and a shrinkage of the first jacket being no greater than about 3.5%;

the fiber optic cable has a crush resistance of at least 100N/cm, allows less than a 0.30 db/km increase of optical attenuation from −20 to 70° C. at 1550 nm for non bend-resistant single mode fiber and meets requirements according to each of IEC 60332-3-24 (Flame Spread), IEC 61034-2 (Low smoke), and IEC 60754-1&2 (non-Halogen);

the reinforcing strands comprise 6×1420 denier aramid yarns (2-12 F 3 mm OD); and the first jacket has a flexural modulus of about 40,000 psi.

20. A fiber optic cable comprising an exterior second jacket surrounding and encasing a plurality of subassemblies, and each one of the plurality of subassemblies comprising:

between 1 to 12 optical fibers;

a plurality of reinforcing strands which are each free of any halogens;

a first jacket being free of any halogens and having a thickness of between about 0.254 to about 0.305 mm; and the first jacket surrounding and completely encasing the 1 to 12 optical fibers and the plurality of reinforcing strands to form one of the subassemblies;

wherein the first jacket and the exterior jacket are manufactured from a material which has a limiting oxygen index (LOI) of at least 35 and a shrinkage of the first jacket and the exterior both being no greater than about 3.0%;

the fiber optic cable has a crush resistance of at least 100N/cm, allows less than a 0.24 db/km increase of optical attenuation from −20 to 70° C. at 1550 nm for non bend-resistant single mode fiber and meets requirements according to each of IEC 60332-3-24 (Flame Spread), IEC 61034-2 (Low smoke), and IEC 60754-1&2 (non-Halogen); and a flexural modulus of the exterior jacket being about 30,000 psi.

\* \* \* \* \*